(No Model.)
W. M. WASHBURN.
FARMER'S LEVEL.
No. 426,696. Patented Apr. 29, 1890.
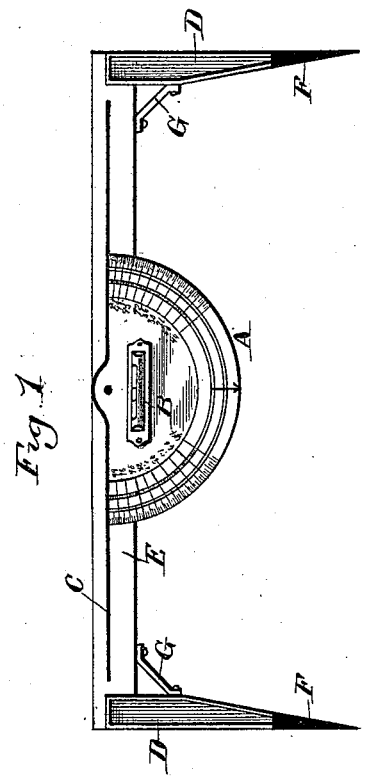
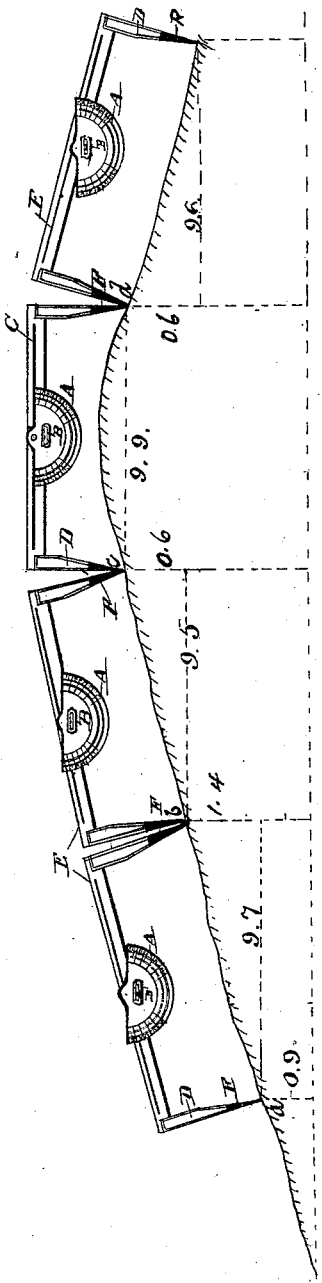
Witnesses
Fred R. Cornwall
C. J. Stockman
Inventor
W. M. Washburn,
By his Attorney in fact
Chas. A. Barber

UNITED STATES PATENT OFFICE.

WILLIAM M. WASHBURN, OF GIBSLAND, LOUISIANA.

FARMER'S LEVEL.

SPECIFICATION forming part of Letters Patent No. 426,696, dated April 29, 1890.

Application filed October 9, 1888. Serial No. 287,646. (No model.)

*To all whom it may concern:*

Be it known that I, WILLIAM M. WASHBURN, a citizen of the United States, residing at Gibsland, in the parish of Bienville, State of Louisiana, have invented certain new and useful Improvements in Farmers' Levels, of which the following is so full, clear, and exact a description as will enable others skilled in the art to which my invention appertains to make and use the same, reference being had to the accompanying drawings, in which—

Figure 1 is a side view of my level of the form in which the elevations and horizontal distances are determined by means of a spirit-level attached to a graduated circular arc. Fig. 2 illustrates the method by which differences of elevation and horizontal distance between points at a distance from each other may be determined by means of my device.

The object of my invention is to provide a means whereby farmers and other field-workers may ascertain differences in level on side hills or terraces or low lands requiring ditches and be able to lay off such work with accuracy without the aid of a skilled engineer.

The principle of my device is to provide an instrument giving the sine of the angle of elevation (which is the difference in level) and the cosine of the same angle, (which is the horizontal distance between the two points,) instead of giving the angle of elevation itself in degrees and minutes, the arc upon which these graduations are made being so arranged that the reading at the "horizontal line" will give the elevation and the horizontal distance in any position of the instrument.

In Fig. 1, E is a board or beam, near the ends of which are attached the legs D D, held securely in place by means of the braces G G and tipped with metal, as shown at F F. At any convenient point between the legs D D a graduated semicircular disk A is attached in such a way as to turn about its own center pivotally. A fine but distinct line C is drawn upon the beam E, passing through the center of revolution of the circle A, and being exactly parallel to a line joining the points of the ferrules F F. This line is the reference-mark at which to read the graduations upon the arc A.

B represents a spirit-level rigidly attached to the revolving disk A, and having its axis parallel to the diameter joining the zero-points of the graduation. The circular disk is graduated to read from zero each way to a number of feet equal to the distance between the ferrule-points F F, said graduations meeting ninety degrees from the zeros. The arc A is graduated duplex in such manner that the outer circle of graduation will give the difference of elevation (the sine of the angle) and the inner circle of graduation will give the corresponding horizontal distance, (or the cosine of the same angle.)

The zero-points being so placed as to fall exactly over the reference-mark C when the points of the ferrules F F are in the same horizontal plane, and the spirit-level B, attached to the circle A, being so arranged that the bubble will stand in the center of the tube in that position of the instrument, it is evident that if the position of the instrument be changed and the points of the ferrules made to rest upon points in different horizontal planes, as on a hillside, and the circle A, being loosely pivoted, be revolved about its center until the bubble stands again in the center of the tube, the diameter joining the zero on the circle will then make with the reference-line on the beam an angle equal to the angle of elevation of the points of the ferrules above or below the horizontal. If therefore the circle A were graduated in degrees and minutes, this angle of elevation would be found at the point where the reference-line C cut the arc; but instead of graduating the circle in degrees and minutes I prefer to calculate by ordinary trigonometrical means the difference in level and in horizontal reach of the ferrule-points F F for all the angular positions they may be made to assume and writing such differences in level and horizontal distance at the proper points on the graduated arc. By this means an uneducated man may read directly from the graduated arc the difference of level and the actual horizontal distance between two points without the use of trigonometrical tables.

If it is required to determine the difference of level between points at a considerable distance from one another, my device may be applied successively, care being taken always to place the hind leg upon the point occupied by the fore leg in the previous application.

In Fig. 2 four positions of my device are shown in this successive operation, assuming it to be required to find the difference of level between the points $a$ and $f$. The grade-peg having been driven at the point $a$, one leg of my device resting upon this peg, the other can then be placed on a second grade-peg, not necessarily in the straight line joining the points $a$ and $f$. Position 1 shows this second point $b$ as being 1.4 of a foot higher than $a$. Position 2 shows point $c$ 0.6 of a foot higher than $b$. Position 3 shows point $d$ on a level with point $c$. Position 4 shows point $f$ 0.6 of a foot lower than $d$; and this process may be extended over any required distance. For each vertical difference as given above the graduation upon the outer circle of the limb gives the corresponding horizontal distance between the several points. Entering these successive readings upon a book or sheet of paper and adding them up, care being taken to place such of the readings for elevation as are upward in one column and those that are downward in another, and subtracting the total of one column from the total of the other, the actual difference of elevation between the two extreme points, being composed of the algebraic sum of the partial differences, will thus be given, and the sum of the readings of the horizontal distances will be the total horizontal distance between the two extremes along the line upon which the levels have been taken.

If it is desired to make a ditch of uniform grade between $a$ and $f$, ascertain what fall the required grade will give for each stride of the instrument. Thus suppose the required grade to be one per cent., or a fall of one foot in one hundred, and the stride of your instrument to be ten feet. Then the fall for each stride of instrument must be 0.1 of a foot. The workman therefore, commencing at either end of the line and working down until the new grade-peg driven at $b$ or at $c$ will show just 0.1 lower if commencing at $a$, or 0.1 higher if at $f$, and continuing the operation, will thus easily accomplish this usually difficult problem without trouble.

The actual amount of work in the ditch can be determined by adding the actual elevations of the surface at the several points determined to the fall due to the grade at that point, and, with this as the depth of cutting and the horizontal distance as the length of each section, computing the contents by the usual rules.

Having now described the objects, uses, and advantages of my device, what I believe to be new and desire to secure by Letters Patent, and what I therefore claim, is—

1. In a farmer's level, the beam and legs and the reference-mark, in combination with a pivoted graduated circle with a level attached, substantially as set forth.

2. In a farmer's level, the beam provided with a reference-mark, having a graduated circle pivoted to said beam and a spirit-level attached to said circle, in combination with legs tipped with metal and the braces, substantially as and for the purposes specified.

3. In a farmer's level, the legs, braces, and beam provided with a reference-mark, in combination with a circle pivoted to said beam, graduated to indicate the difference in level between the ends of said legs, and a spirit-level attached to said circle, substantially as and for the purposes specified.

4. In a farmer's level, the legs, braces, and beam provided with a reference-mark, in combination with a circle pivoted to said beam, graduated to indicate the horizontal distance between the ends of said legs, and a spirit-level attached to said circle, substantially as specified.

In testimony whereof I affix my signature in the presence of two witnesses.

WILLIAM M. WASHBURN.

Witnesses:
R. S. WEBB,
W. L. KIM.